United States Patent [19]

Kawahara et al.

[11] Patent Number: 4,992,330

[45] Date of Patent: Feb. 12, 1991

[54] MAGNETIC RECORDING MEDIUM

[75] Inventors: Setsuko Kawahara; Noboru Koyama; Yasushi Nakano; Noboru Nakajima, all of Hino, Japan

[73] Assignee: Konica Corporation, Tokyo, Japan

[21] Appl. No.: 448,667

[22] Filed: Dec. 11, 1989

[30] Foreign Application Priority Data

Dec. 12, 1988 [JP] Japan .................. 63-314490
Feb. 14, 1989 [JP] Japan .................. 1-35545

[51] Int. Cl.⁵ .................................... G11B 23/00
[52] U.S. Cl. ................... 428/329; 428/336; 428/408; 428/694; 428/900
[58] Field of Search ........... 428/408, 336, 694, 900, 428/329; 427/131

[56] References Cited

U.S. PATENT DOCUMENTS

| | | | |
|---|---|---|---|
| 4,259,392 | 3/1981 | Suzuki | 428/339 |
| 4,506,000 | 3/1985 | Kubota et al. | 428/694 |
| 4,562,117 | 12/1985 | Kikukawa et al. | 428/694 |
| 4,643,941 | 2/1987 | Miyoshi et al. | 428/694 |
| 4,678,697 | 7/1987 | Miyoshi et al. | 428/694 |
| 4,716,076 | 12/1987 | Morioka et al. | 428/694 |
| 4,847,147 | 7/1989 | Aonuma et al. | 428/694 |
| 4,851,289 | 7/1989 | Ogawa et al. | 428/694 |

*Primary Examiner*—Paul J. Thibodeau
*Attorney, Agent, or Firm*—Jordan B. Bierman

[57] ABSTRACT

A magnetic recording medium is disclosed, which has excellent electro-magnetic conversion characteristics and is improved in drop-out. The magnetic recording medium comprises a non-magnetic support and a plurality of magnetic layers provided on the support, and the magnetic layer being provided farthest from said support among these magnetic layers comprises a magnetic powder and a carbon black in an amount of not more than 1 part per 100 parts by weight of said magnetic powder; and another magnetic layer comprising a magnetic powder has a thickness of not more than 2.5 μm, and 900 nm light-transmittance of said magnetic medium is not more than 0.1%.

14 Claims, 2 Drawing Sheets

MAGNETIC RECORDING MEDIUM

FIELD OF THE INVENTION

The present invention relates to magnetic recording media such as magnetic recording tapes, magnetic sheets, magnetic disks, and the like.

BACKGROUND OF THE INVENTION

In recent years, there has been a growing tendency in magnetic recording media, especially in magnetic recording media for videorecorders required to record a short wave length signal, to use the magnetic powder having finer grain size and higher capability of magnetization.

However, when the grain size of magnetic powder is made finer and its BET value is increased, the light transmittance of the magnetic recording medium is increased and the efficiency to shield light is decreased. This causes a problem relating to the light-transmission of the recording medium. For example, in the case of a videotape, the end of the tape is detected by the variation of light transmittance. Especially in the case of VHS type videotape, the light transmittance of the videotape must be not more than 0.1%, at a wave length of 900 nm.

Recently, there has been a tendency to reduce the thickness of a videotape in order to make it possible to increase the recording time of a videotape. Accordingly, the thickness of the magnetic layer becomes thinner, which is why the magnetic layer is required to have its light-shielding power increased.

As a measure to increase the light-shielding power of a videotape, it is publicly known that carbon black is added to a magnetic layer. However, when too much carbon black is added to a magnetic layer, it causes a reduction of the dispersibility of the magnetic powder and carbon black in the paint, and furthermore it causes a reduction of the stability of the dispersion. Since the magnetic powder is reduced in quantity, the electro magnetic conversion characteristic and tape running durability are deteriorated.

SUMMARY OF THE INVENTION

It is an object of the invention to provide an improved magnetic recording medium which has excellent electro magnetic conversion characteristics and tape running durability, the magnetic layer of which has an increased light-shielding power, and furthermore the thickness of the magnetic layer is reduced.

The above object of the invention is achieved by a magnetic recording medium comprising a non-magnetic support having thereon a plurality of magnetic layers wherein, the magnetic layer being provided farthest from the support among the magnetic layers comprises a magnetic powder and a carbon black in an amount of not more than 1 part per 100 parts by weight of the magnetic powder; and another magnetic layer comprising a magnetic powder has a thickness of not more than 2.5 μm, and 900 nm light-transmittance of the magnetic medium is not more than 0.1%.

DETAILED DESCRIPTION OF THE INVENTION

Figure 1:
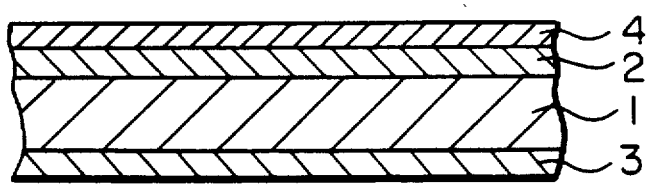
FIG. 1 and FIG. 2 are fragmentary sectional views of one of the examples of a magnetic recording medium of the present invention.
Figure 2:
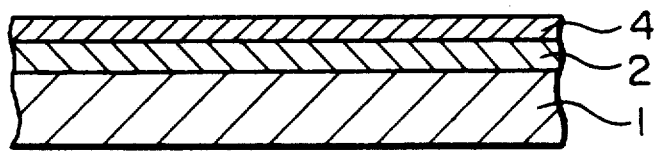

As shown in FIG. 1, an embodiment of the magnetic recording medium of the present invention comprises the non-magnetic support 1 made from polyethylene terephthalate and the like, the lower magnetic layer 2 on the non-magnetic support 1, and the upper magnetic layer 4 on the lower magnetic layer 2. The magnetic recording medium has the back coat layer (BC layer) 3 on the opposite side of the magnetic layer 2. A subbing layer may be provided between the lower magnetic layer 2 and the non-magnetic support 1. Otherwise, the non-magnetic support 1 may be processed by the method of corona discharge. An overcoat layer may be provided on the upper magnetic layer 4. As shown in FIG. 2, the magnetic recording medium may not be provided with the back coat layer.

In the case of the magnetic recording medium of the present invention, the carbon black content of the magnetic layer farthest from the support (the upper magnetic layer 4 in the example shown in FIG. 1) is not more than 1 part, preferably 0.2 to 0.8, per 100 parts by weight of magnetic powder. Therefore, as compared with a conventional magnetic recording medium, the carbon black content of the magnetic layer farthest from the support is very small. Accordingly, magnetic powder is dispersed uniformly and the filling ratio of magnetic powder in the layer is increased. Furthermore, the content of the high-molecular binding agent in the magnetic layer becomes high. As a result, the electromagnetic conversion characteristics and running durability of the magnetic recording medium are remarkably improved.

However, in the case the carbon black content of the magnetic layer is merely reduced, light-shielding power of the magnetic layer is decreased and it leads to a decrease of light-shielding power of the magnetic recording medium. For that reason, the prescribed light detection can not be conducted and it causes a problem.

Since the light transmittance of the magnetic recording medium is not more than 0.1% at a wave length of 900 nm in the present invention, the detection by light can be positively performed. Furthermore, since the thickness of another magnetic layers provided under the magnetic layer farthest from the support is not more than 2.5 μm in the invention, it is possible to reduce the thickness of the whole magnetic layers of the magnetic recording medium and to store recorded information for a long time. In order to keep the thickness of another magnetic layer except the magnetic layer farthest from the support to be not more than 2.5 μm while transmittance of light is kept to be the above-described value, it is preferable that not less than 8 parts by weight (more preferably 10 to 30 parts by weight) of carbon black per 100 parts by weight of magnetic powder are contained in the magnetic layer. Hereinafter, such magnetic layer is also called 'light-shielding magnetic layer'. The examples of the carbon black to be used in the invention will be described later. The carbon black for light-shielding use can also be used as a part of the carbon black or as the whole of the carbon black for this object. Even when a large amount of carbon black is contained in the magnetic layers except the magnetic layer farthest from the support as described above. dropout does not occur and it is rather advantageous to reduce the surface specific resistance of the recording medium.

It is preferable to use magnetite or magnetite-type ferromagnetic powder in the light-shielding magnetic layer. Divalent iron compound such as magnetite is generally black. When the content of divalent iron compound is increased, the degree of blackness and light-shielding power of ferromagnetic powder, for example ferrous oxide magnetic powder, are increased. Therefore, the effect of the magnetic layer with the light-shielding power is further increased in cooperation with the above-described carbon black. Ferromagnetic metal powder may be used as the magnetic powder of the light-shielding magnetic layer.

This ferromagnetic fine metal powder will be explained as follows. The metal powder preferably contains not less than 75% by weight of metal component and not less than 80% of the metal component is at least one kind of ferromagnetic metal or ferromagnetic alloy such as Fe, Co, Ni, Fe-Co, Fe-Ni, Co-Ni. and Co-Ni-Fe. These metal components allowed to contain not more than 20% by weight of other metals such as Al, Si, S, Se, Ti, V, Cr, Mn. Cu. Zn, Y, Mo, Rh, Pd, Ag. Sa, Sb, B, Ba. Ta, W. Re, Au. Hg. Pb, P, La, Ce. Pr, Nd, Te, and Bi. The above-described ferromagnetic metal components may contain a small amount of water, hydroxide, or oxide.

Fine powder of ferromagnetic chrome dioxide can be contained in the light-shielding magnetic layer as the ferromagnetic powder. In this case, the light-shielding power of the magnetic layer can be increased owing to the high degree of blackness of ferromagnetic chrome dioxide.

In the case carbon black is not contained in the magnetic layers except the magnetic layer farthest from the support or the content of carbon black is not more than 8 parts per 100 parts by weight of magnetic powder, light transmittance at a wave length of 900 nm, can be not more than 0.1% by providing the back coat layer containing carbon black. In order to make the light transmittance of a magnetic recording medium not more than 0.1%, a colored film may be used as a support. For instance, carbon black may be contained in the film or a carbon black layer may be provided between a plurality of films constituting a support.

As a back coat layer, white nonmagnetic abrasive particles can be contained in the resin which composes the back coat layer. The white back coat layer described above is highly durable. Accordingly, it is effective to increase running durability. For example, zinc oxide, barium carbonate, are used as the white nonmagnetic abrasive particles for the above-described object. The white back coat layer does not have high light-shielding efficiency. Nevertheless, in the case of the magnetic recording medium of the present invention, the light-shielding means described before is provided. Therefore, the magnetic recording medium is given high durability due to the white back coat layer without causing any problem.

The thickness of the magnetic layer farthest from the support is preferably 0.5% to 1.5 $\mu$m. It is more preferable that the thickness of the light-shielding magnetic layer is 1.5 to 2.5 $\mu$m.

The surface specific resistance of the magnetic recording medium is preferably not more than $10^8$u/sq.

The following magnetic powder can be contained in each magnetic layer.

They are $\gamma$—$Fe_2O_3$, $Fe_3O_4$, the intermediate oxide of them, iron oxide magnetic powder containing cobalt which is made by doping or adhering cobalt atoms to the iron oxide, ferromagnetic chrome dioxide powder, iron nitride power, iron carbide powder, ferromagnetic metal powder, barium ferrite. or denatured barium ferrite with metals such as titanium, cobalt.

Ferromagnetic metal powder containing not less than 80% of Fe or $\gamma$—$Fe_2O_3$ (Co—$\gamma$—$Fe_2O_3$) doped or adhered with cobalt atoms is preferably used in the magnetic layer farthest from the support among the above-described magnetic powder. The magnetic powder the specific surface area of which is 30 to 80 m²/g, more preferably 35 to 55 m²/g, in BET value is preferably used as the magnetic layer farthest from the support. In the case Co—$\gamma$—$Fe_2O_3$ is used, the magnetic powder having a BET value of 40 to 70 m²/g and a coercive force Hc of 700 to 1000 Oersted (Oe), more preferably 800 to 1000 Oersted, is preferably used. In the case the BET value of the used magnetic powder of Co—$\gamma$—$Fe_2O_3$ is smaller than 40 m², the electric conversion characteristic, especially the chroma S/N ratio, is deteriorated. It is also not preferable to use the Co—$\gamma$—$Fe_2O_3$ having the coercive force smaller than 700 Oersted. Since the output becomes lower over the high frequency bands.

Magnetite represented by FeOx in which x is not less than 1.3 and smaller than 1.5, magnetic alloy powder such as Fe-Al, ferromagnetic chrome dioxide, or CO—$\gamma$—$Fe_2O_3$ are preferably used as the second magnetic layer. The magnetic powder having a BET value of 20 to 70 m²/g and a coercive force Hc of 400 to 1000 Ooersted (Oe) is preferably used as the magnetic powder used in the light-shielding magnetic layer.

The above-described specific surface represented by a BET value means the surface area per unit weight. It is a physical quantity quite different from the average particle size. For instance, there are many kinds of magnetic powder different in the specific surface area from each other,. even though the average particle sizes are the same.

The measuring method of specific surface area will be explained as follows. The powder to be measured is heated at a temperature of 250° C. for 30 to 60 minutes. While being heated, it is degassed to eliminate the substance adsorbed by the powder. After that,. the powder is put in the measuring apparatus. In the apparatus,. the initial pressure of nitrogen is set to 0.5 kg/m² and adsorption measurement is conducted at a temperature of −195° C. with liquid nitrogen. This method is generally called B.E.T Method to measure specific surface area. For further details, refer to J. Ame. Chem. Soc. 60 309 (1938). 'Bulk Material Measuring Apparatus (Kantasorb)' which was manufactured by the joint work of Yuasa Battery Co. and Yuasa Ionics Co. can be used as the specific surface area or BET value measuring apparatus. The general description of specific surface area and its measuring methods are described in detail in 'Measurment of Bulk Materials' (by J. M. Dallavalle, and Clydeorr Jr. translated by Muta and others: published by Sangyo Tosho Co.). The general description of specific surface area and its measuring methods are also described in 'Chemical Hand Book' (the chapter of application, p 1170 to p 1171, by Japan Chemical Society of Japan, published by Maruzen Co. in Apr. 30, 1966). In the above-mentioned 'Chemical Hand Book'.

specific surface area is simply described as surface area (m²/gr), which is the same as the specific surface area described in this specification.

The ferromagnetic powder used in the present invention can be manufactured by the publicly known manufacturing method. There is no restriction in the shape of the particle of the ferromagnetic powder in particular. The needle-shaped particle,. the grain-shaped particle,. the cubic-shaped particle, the rice grain-shaped particle, and linear-shaped particles are usually used. It is preferable to use a ferromagnetic powder,. the particles of which are needle-shaped.

The binders used in each layer of the magnetic recording medium have a molecular weight of 10000 to 200000. For instance,. the following may be used as the binder. They are vinyl chloride-vinyl acetate copolymer: vinyl chloride-vinylidene chloride copolymer: vinyl chloride-acrylonitrile copolymer: urethane resin: butadiene-acrylonitrile copolymer: polyamide resin; polyvinyl butyral: cellulose derivatives such as cellulose acetate butylate, cellulose diacetate, cellulose triacetate, cellulose propionate, cellulose nitrate; styrene-butadiene copolymer; polyester resin: various kinds of synthetic rubber; phenol resin: epoxy resin; urea resin; melamine resin; phenoxy resin; silicone resin: acrylate reaction resin: a mixture of high-molecular polyester resin and isocyanate prepolymer; a mixture of polyester polyol and polyisocyanate; urea-formaldehyde resin; a mixture of low-molecular glycol, high-molecular diol and isocyanate, and a mixture of these materials.

It is preferable that these binders are made from resin containing hydrophilic polar groups such as —$SO_3M$, —COOM, and —PO(OM')$_2$ in which M is alkali metals such as lithium, potassium, sodium. M' is a hydrogen atom alkali metals such as lithium, potassium, sodium: or a hydrocarbon residue. To be more specific, the resin described above has familiarity with magnetic powder due to the polar groups in the molecule. Therefore, dispersibility of magnetic powder is further improved and aggregation of magnetic powder can be prevented. As a result, stability of the coating liquid can be further improved which leads to the improvement of durability of the magnetic recording medium.

The above-described binders, especially vinyl chloride copolymer, can be obtained by copolymerization of vinyl chloride monomer, copolymerizable monomer containing sulfonic acid or phosphoric acid or alkali salt thereof, and other copolymerizable monomers if necessary. Since this copolymer is made by the method of vinyl synthesis, it can be easily synthesized and copolymerization components can be selected diversely. Accordingly, the characteristics of the copolymer can be controlled most suitably.

The above-described metals of the salt of sulfonic acid or phosphoric acid are alkali metals, especially sodium, potassium, and lithium, and especially potassium is preferable in terms of solubility, reactivity, and yield.

The following are the above-described copolymerizable monomers containing sulfonic acid salt.

$CH_2=CHSO_3$ M
$CH_2=CHCH_2$ $SO_3$ M
$CH_2=C(CH_3)$ $CH_2$ $SO_3$ M
$CH_2=CHCH_2$ OCOCH $(CH_2$ COOR) $SO_3$ M
$CH_2=CHCH_2$ OCH$_2$ CH (OH) CH$_2$ $SO_3$ M
$CH_2=C(CH_3)$ COOC$_2$ H$_4$ $SO_3$ M
$CH_2=CHCOOC_4$ H$_8$ $SO_3$ M
$CH_2=CHCONHC(CH_3)_2$ CH$_2$ $SO_3$ M

The following are monomers containing phosphoric acid salt.

$CH_2=CHCH_2$ OCH$_2$ CH (OH) CH$_2$—O—PO$_3$ MY$^1$
$CH_2=CHCONHC(CH_3)_2$ CH$_2$—O—PO$_3$ MY$^2$
$CH_2=CHCH_2$

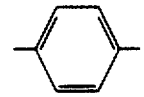

—O (CH$_2$ CH$_2$ O)n PO$_2$ MX$^1$
$CH_2=CHCH_2$ O (CH$_2$ CH$_2$ O)m PO$_2$ MX$^2$

In the aboves M is an alkali metal, and R is an alkyl group having 1 to 20 carbon atoms.

Y$^1$ is H, M. or
$CH_2=CHCH_2$ OCH$_2$ CH (OH) CH$_2$—.
Y$_2$ is H, M, or
$CH_2=CHCONHC(CH_3)_2$ CH$_2$ —.
X$^1$ is
$CH_2=CHCH_2$

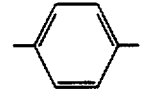

O (CH$_2$ CH$_2$ O)n—, OH or OM.
X$^2$ is
$CH_2=CHCH_2$ O (CH$_2$ CH$_2$ O)m—, OH, or OM.
n is an integer from 1 to 100. m is an integer from 1 to 100.

Publicly known polymerized monomer is used as necessary. For instance, the following polymerized monomers are used. They are various vinyl esters, vinyliden chloride. acrylonitrile, methacrylonitrile, styrene. acrylic acid. methacrylic acid, various acrylic acid or methacrylic acid esters, ethylene, propylene, isobutane, butadiene, isoprene. vinyl ether, aryl ether, aryl ester, acrylic amide, methacrylic amide, maleic acid, maleic acid ester.

These binders are polymerized by the methods of solution polymerization, suspension polymerization, and massive polymerization. Publicly known technology can be applied to each case such as using a polymerization controlling agent, using an initiator, divisional adding of monomer, and continuous adding of monomer.

It is preferable that the amount of monomer containing salt of the acid group in the binder is O.1 to 30 mol %. In the case the amount of monomer containing the acid group is too large, solubility of the binder to solvent is degraded and the binder tends to gel. In the case the amount of monomer containing the acid group is too small, the desired characteristics can not be obtained.

The above-described vinyl chloride copolymer may further contain epoxy groups or hydroxyl groups.

The conventional vinyl chloride copolymer, for instance VAGH made by U.C.C. Co., comprises the following copolymer components. The formulas show copolymerized units.

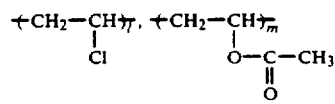

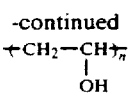

However, it is considered that it is difficult for the group of CH₃ CO—O— to contribute to crosslinking reaction with a hardening agent. It is preferable to replace CH₃ CO with epoxy groups as follows.

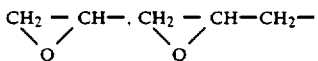

For example, a copolymer with the following units is listed.

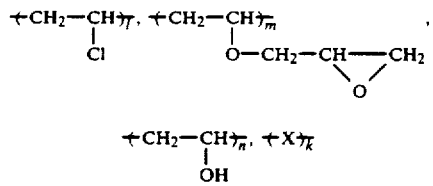

In the formulae, X is monomer unit containing alkali metal salt of sulfone group or phosphor group.

In the magnetic layer of the recording medium. polyurethane may be used together with vinyl chloride resin, epoxy resin, especially phenoxy resin, polyester resin, or cellulose nitrate resin (The above-described resins are called 'other resins' in this specification hereafter.). In this case, the ratio of the above-described urethane resin to other resin is preferably 90 to 10 parts by weight of other resin, more preferably 80 to 20 parts by weight of other resin. In the case the ratio exceeds 90 parts by weight, the layer becomes fragile and durability is remarkably deteriorated. Furthermore, adhesion between the layer and the support is degraded. In the case the compounding ratio is smaller than 10 parts by weight, magnetic powder is liable to fall off.

The resins having the negative functional group are available, for example, under the name of '400 × 110A' manufactured by Nippon Zeon Co., 'MR-110' manufactured by Nippon Zeon, 'TIM-3005' manufactured by Sanyo Chemical Industry Co., 'UR-8300' manufactured by Toyobo Co., 'UR-8600' manufactured by Toyobo Co.. and 'Bayron 530' manufactured by Toyobo Co.

Moreover, in the present invention, the durability of the magnetic recording medium can be improved by adding the polyisocyanate-type hardening agent such as the following to the magnetic paint containing the binder. They are dual function isocyanates such as tolylenediisocyanate. diphenylmethanediisocyanate, and hexanediisocyanate, three function isocyanates such as Coronate L manufactured by Nippon Polyurethane Industry Co., and Desmodur L manufactured by Bayer Co. Furthermore, the conventional hardening agents such as urethane prepolymer having isocyanate groups at both ends of the molecule can be used, and polyisocyanate capable of being used as the hardening agent can be used. The polyisocyanate type hardening agent is used in a proportion within the range of 5 to 80 parts by weight of the whole amount of the binder used.

In the magnetic layer which is closest to the nonmagnetic support such as magnetic layer Z of the example shown in FIG. 1, the polyisocyanate hardening agent may not be added to the magnetic paint so that each layer becomes more adherent to the nonmagnetic support.

The following carbon blacks can be contained in each magnetic layer. The examples of light-shielding carbon black are as follows. They are Raven 2000 manufactured by Columbia Carbon Co. (BET value is 190 m²/g and the particle size is 18 mμ.), 2100, 1170, and 1000. Furthermore, they are #100, #75, #40, #35, and #30 manufactured by Mitsubishi Kasei Industry Co.

The following are the examples of electric conductive carbon black. They are Conductex 975 (BET value is 250 m²/g. DBP oil absorption is 170 ml/100 gr, and the particle size is 24 mμ.), Conductex 900 (BET 125 m²/g, the particle size 27 mμ), Conductex 40-220 (the particle size 20 mμm), Conductex SC (BET 220 m²/gr, DBP 115 ml/100 gr, the particle size 20 mμ). Cabot Vulcan XC-72 (BET value 254 m²/g, the particle size 30 mμ), Vulcan P (BET 143 m²/g, the particle size 30 mμ), 20 mμ), Raven 1040, Raven 420, Black Pearls 2000 (the particle size 15 mμ), and #44 manufactured by Mitsubishi Kasei Industry Co.

The following carbon black can be also used in the present invention. They are Conductex-SC (BET 220 m²/g, DBP 115 ml/100 g, the particle Size 20 mμ) manufactured by Columbia Carbon Co., Vulcan 9 (BET 140 mμ/g, DBP 114 ml/100 g, the particle size 19 mμ) manufactured by Cabot Co., #80 (BET 117 m²/g, DBP 113 ml/100 g, the particle size 23 mμ) manufactured by Asahi Carbon Co., HS 100 (BET 32 m²/g, DBP 180 ml/100 g, the particle size 53 mμ) manufactured by Denki Kagaku Co., #22B (BET 55 m²/g, DBP 131 ml/100 g, the particle size 40 mμ) manufactured by Mitsubishi Kasei Industry Co., #20B (BET 56 m²/g, DPG 115 ml/10-g, the particle size 40 mμ), #3500 (BET 47 m²/g, DBP 187 ml/100 g, the particle size 40 mμ0. The following can be also used for the object. They are CF-9, #4000, and MA-600 manufactured by Mitsubishi Kasei Co. They are Black Pearls L, Monarck 800, Black Pearls 700, Black Pearls 1000, Black Pearls 880, Black Pearls 900, Black Pearls 1300, Black Pearls 2000, and Sterling V manufactured by Cabot Co. They are Raven 410, Raven 3200, Raven 430, Raven 450, Raven 825, Raven 1255, Raven 1035, Raven 1000, Raven 5000, and Ketchen Black FC manufactured by Columbia Carbon Co.

Fatty acid and fatty acid ester can be contained as lubricant in each magnetic layer provided on the nonmagnetic support. By jointly adding fatty acid and fatty acid ester to the magnetic layers, full advantage of their characteristics can be taken. At the same time, the faults which are inevitable when they are used individually can be avoided by using them together, and the lubrication effect is improved. Furthermore, durability in a still image reproducing mode, running stability, and the S/N ratio can be enhanced. In this case, the amount of fatty acid ester to be added is preferably 0.2 to 10 parts, more preferably 0.5 to 8.0 parts by weight per 100 parts by weight of magnetic powder. When the amount of fatty acid ester is small out of the range, the dispersibility of magnetic powder in the paint is deteriorated, and the running ability of the magnetic recording medium is decreased. When the amount of fatty acid ester is too large, there is a tendency that fatty acid oozes out and the output of the magnetic recording medium is lowered. It is preferable that the amount of fatty acid ester is 0.1 to 10 parts, more preferably 0.2 to 8.5 parts, by weight per 100 parts by weight of magnetic powder.

When the amount of ester is small out of the range, the running ability is hardly improved. When the amount of ester is too large, there is a tendency that ester oozes out or the output of the recording medium is lowered.

In order to heighten the effects described above, it is preferable that the weight ratio of fatty acid to fatty acid ester is kept within the range of fatty acid/fatty acid ester =10/90 /to 90/10. Fatty acid Can also display a dispersion effect. By using fatty acid in the magnetic layer, the using amount of another dispersing agent with low molecular weight can be reduced. As a result, Young's modulus of the magnetic recording medium can be increased in accordance with the amount of the dispersion agent curtailed.

Fatty acid may be either monobasic or dibasic. It is preferable that a fatty acid should be used which has 6 to 30 carbon atoms, more preferably 12 to 22 of carbon atoms. The examples of fatty acids are shown below.

(1) Caproic acid
(2) Caprylic acid
(3) Capric acid
(4) Lauric acid
(5) Myristic acid
(6) Palmitric acid
(7) Stearic acid
(8) Isostearic acid
(9) Linolenic acid
(10) Linolic acid
(11) Oleic acid
(12) Elaidic acid
(13) Behenic acid
(14) Malonic acid
(15) Succinic acid
(16) Maleic acid
(17) Glutaric acid
(18) Adipic acid
(19) Pimelic acid
(20) Azelaic acid
(21) Sebacic acid
(22) 1, 12-Dodecanedicarboxylic acid
(23) Octanedicarboxylic acid The fatty acid esters of the above-described acids are as follows.

(1) Oleyloleate
(2) Oleyl stearate
(3) Isocetyl stearate
(4) Dioleyl maleate
(5) Butyl stearate
(6) Butyl palmitate
(7) Butyl myristate
(8) Octyl myristate
(9) Octyl palmitate
(10) Amyl stearate
(11) Amyl palmitate
(12) Isobutyl oleate
(13) Stearyl stearate
(14) Lauryl oleate
(15) Octyl oleate
(16) Isobutyl oleate
(17) Ethyl oleate
(18) Isotridecyl oleate
(19) 2-Ethylhexyl stearate
(20) 2-Ethylhexyl myristate
(21) Ethyl stearate
(22) Z-Ethylhexyl palmitate
(23) Isopropyl palmitate
(24) Isopropyl myristate
(25) Butyl laurate
(26) Cetyl-2-ethyl hexylate
(27) Dioleyl adipate
(28) Diethyl adipate
(29) Diisobutyl adipate
(30) Diisodecyl adipate Compounds other than the above-described fatty acids and fatty acid esters may be added to the magnetic layers. The examples of the compounds are lubricant such as silicone oil. carboxylic acid modified silicone oil, ester modified silicone oil, graphite, carbon fluoride, molybdenum disulfide, tungsten disulfide, fatty acid amide, and α-olefinoxide. Non-magnetic abrasive particles may be added to the magnetic layers. The examples of the non-magnetic abrasive are α-alumina, chromium oxide, titanium oxide. α-iron oxide, silicon oxide, silicon nitride, silicon carbide, zirconium oxide, zinc oxide, cerium oxide, magnesium oxide, and boron nitride. It is preferable that the average particle size of the abrasive is not more than 0.6 $\mu$m. It is preferable that the abrasive is not less than 5 on Mohs' hardness scale.

Furthermore, the antistatic agent such as graphite and the dispersion agent such as lecithin powder and phosphoric ester may be added to the magnetic layers.

It is preferable that the average particle size of the non-magnetic particles contained in the back coat layer, is in the range of 10 m$\mu$ to 1000 m$\mu$. When the average particle size is in the above-mentioned range, the size of the non-magnetic particle is adequate and an excellent effect can be obtained when they are added.

The following are examples of non-magnetic particles suitably used in the back coat. They are silicon oxide, titanium oxide, aluminum oxide, chromium oxide, silicon carbide, calcium carbonate, zinc oxide, $\alpha\text{-Fe}_2\text{O}_3$, talc, kaolin, calcium sulfate, boron nitride, zinc fluoride, and barium sulfate. Organic powders can be used which comprises, for instance, benzoguanamine resin, melamine resin, and phthalocyanine pigment. The organic powder and the above-described inorganic powder can be used together.

Furthermore, a carbon black is preferably used together with the above-described non-magnetic particles. By using carbon black, the running of the magnetic recording medium is further stabilized and durability of the medium is further increased in cooperation with the effect of the non-magnetic particles.

It is preferable that the average surface roughness of the magnetic layer farthest from the support is 0.005 to 0.020 $\mu$m, under measuring conditions in which the cutoff value is 0.08 mm and the measuring length is 2.5 mm. In this case the running ability of the medium is not decreased and the S/N ratio can be increased.

The following are used as the support of the magnetic recording medium. They are polyolefines such as polyethylene terephthalate. polyethylene-2, 6-naphthalate, cellulose derivatives such as cellulose triacetate, and cellulose diacetate, and plastics such as polyamide, and polycarbonate. The support made from metals such as Cu. Al, and Zn, glass, ceramics such as boron nitride, and silicone carbide are also can be used. In the case the magnetic recording medium is a film or a sheet, the thickness of the support ie 3 to 100 $\mu$m, preferably 5 to 50 $\mu$m. In the case the recording medium is a disk or a card, the thickness of the support is 30 $\mu$m to 10 mm. In the case of a drum-shaped recording medium, the support is cylindrically shaped. The shape of a magnetic recording medium is determined according to the recorder to be used.

An intermediate layer may be provided between the support and the magnetic layer in order to increase adhesion.

The following are the applicable coating methods to form the above-described magnetic layers on the support. They are the air doctor coating method, the blade coating method, the air knife coating method, the squeeze coating method, the dip coating method, the reverse roll coating method, the transfer roll coating method, the gravure coating method, the kiss coating method, the cast coating method, the spray coating method, and the extrusion coating method. The coating method is not limited to these described above. When a magnetic layer is formed on the support with these coating methods, there are two methods. One is a method in which the coating and drying process is completed to form one magnetic layer and this process is repeated layer by layer. This method is so called 'Wet on dry coating method'. The other is a method in which an upper layer is coated on a wet lower layer simultaneously or one after another. This method is called the 'Wet on wet coating method'. Either method can be applied to manufacture the magnetic recording medium of the present invention.

Under the condition that the effect of the present invention is not affected, other magnetic layer or non-magnetic layer may be provided on the upper side or lower side of the magnetic layer farthest from the support and the other magnetic layer, or between these magnetic layers.

The magnetic layer coated on the support by the above-described methods is dried after the treatment for orientating the ferromagnetic powder, if it is necessary.

In this case, the magnetic field for orientation is 500 to 5000 gauss by A.C. or D.C. current. The drying temperature is approximately 50° to 120° C. The drying time is about 0.5 to 10 minutes. As occasion demands, the surface of the magnetic layer is smoothed or the magnetic layer is cut to the desired shape for making the magnetic recording medium of the present invention.

EXAMPLES

In the following examples, 'parts' means weight parts.
To manufacture a videotape
Preparation of magnetic paint for the lower magnetic layer

| | |
|---|---|
| Magnetic powder (shown in the following table) | 100 parts |
| Al₂O₃ (Average particle size 0.2 μm) | 5 parts |
| Carbon black | Shown in the following table |
| Vinyl chloride/vinyl acetate/vinyl alcohol copolymer | 13 parts |
| Polyester polyurethane, 'Estan 5701' | 5 parts |
| Myristic acid | 1 parts |
| Stearic acid | 1 parts |
| Butylstearate | 2 parts |
| Cyclohexanone | 100 parts |
| Methyl ethyl keton | 100 parts |
| Toluene | 100 parts |

Preparation of magnetic paint for the upper magnetic layer

| | |
|---|---|
| Magnetic powder (shown in the following table) | 100 parts |
| Al₂O₃ (average particle size 0.2 μm) | 5 parts |
| Carbon black | Shown in the following table |
| Vinyl chloride/vinyl acetate/vinyl alcohol copolymer | 13 parts |
| Polyester polyurethane 'Estan 5701' | 5 parts |
| Myristic asid | 1 parts |
| Stearic acid | 1 parts |
| Butylstearate | 2 parts |
| Cyclohexanone | 100 parts |
| Methyl ethyl ketone | 100 parts |
| Toluene | 100 parts |

Each magnetic paint with the above-described composition was kneaded and dispersed by a ball mill and sand mill, 'Colonate L' manufactured by Nippon Polyurethane Industry Co. was added by 5 weight parts to each paint.

In the next stage, the above-described magnetic paint for the lower magnetic layer was coated on a polyethylene terephthalate base film with the thickness shown in the following table. After that, the above-mentioned magnetic paint for the upper layer was coated on the lower magnetic layer. After orientation and drying were conducted, calender processing was carried out. The thickness of each layer is indicated in the following table.

A large width magnetic film was made in this way and wound up. This film was cut down to ½ inch width to make video tapes shown in the table.

However, in the video tape in the case of Comparative Example 4, only the lower magnetic paint for lower layer was coated on a base film so that the layer thickness was 3.5 μm after calendering. In the video tape in the case of Comparative Example 5, only the magnetic paint for the upper layer was coated on a base film so that the layer thickness was 3.5 μm after calendering. In the video tapes of Example 7, 8, 9, 13, and 15, the following paint for the back coat layer was coated on the opposite side of the base film from the magnetic layer so that the thickness of the back coat layer was 1 μm after drying.

| Paint for the back coat layer | | |
|---|---|---|
| Example 7 | ZnO (white) | 90 parts |
| | Polyurethane (N-2301) | 20 parts |
| | Nitrocellulose | 30 parts |
| | Colonate L (manufactured by Nippon Polyurethane Co.) | 13 parts |
| | Methyl ethyl keton | 1000 parts |
| | Toluene | 800 parts |
| Example 8 | Barium carbonate (white) | 90 parts |
| | Polyurethane (N-2301) | 20 parts |
| | Nitrocellulose | 30 parts |
| | Colonate L (manufactured by Nippon Polyurethane Co.) | 13 parts |
| | Methyl ethyl ketone | 1000 parts |
| | Toluene | 800 parts |
| Example 9 | Carbon black (Raven 1035) | 60 parts |
| | Polyurethane (N-2301) | 20 parts |
| | Nitrocellulose | 30 parts |
| | Colonate L (manufactured by Nippon Polyurethane Co.) | 13 parts |
| | Methyl ethyl ketone | 1000 parts |
| | Toluene | 800 parts |
| Example 13 | ZnO (white) | 60 parts |
| | Polyurethane (N-2301) | 20 Parts |
| | Nitrocellulose | 30 parts |
| | Colonate L (manufactured by Nippon Polyurethane Co.) | 13 parts |
| | Methyl ethyl ketone | 1000 parts |
| | Toluene | 800 parts |

-continued

| Paint for the back coat layer | | |
|---|---|---|
| Example 15 | Carbon black (Raven 1035) | 30 parts |
| | Barium carbonate (white) | 45 parts |
| | Polyurethane (N-2301) | 20 parts |
| | Nitrocellulose | 30 parts |
| | Colonate L | 13 parts |
| | (manufactured by Nippon Polyurethane Co.) | |
| | Methyl ethyl ketone | 1000 parts |
| | Toluene | 800 parts |
| | Carbon black (Raven 1035) | 45 parts |

In the Example 8, the following were used as both the lower magnetic layer paint and the upper magnetic layer paint instead of vinylchloride resin and polyurethane.

| Sodium sulfonate containing vinylchloride-vinylacetate resin MR-110' (manufactured by Nippon Zeon Co.) | 10 parts |
|---|---|
| Polyurethane having sulfo group 'UR-8300' (manufactured by Toyobo Co.) | 5 parts |

The characteristics of the magnetic powder used in the magnetic parts are as follows.

| Magnetic paint for lower layer | | |
|---|---|---|
| Co-γ-Fe₂O₃ | BET value: 30 m²/g | |
| | Hc: 650 Oe | |
| Co—FeOx (x = 1.35) | BET value: 30 m²/g Hc: 700 Oe | |
| Co—FeOx (x = 1.36) | BET value: 28 m²/g Hc: 550 Oe | |
| Co—FeOx (x = 1.38) | BET value: 35 m²/g Hc: 600 Oe | |
| Fe—Al | Al: 2 atomic % BET value: 50 m²/g Hc: 1500 Oe | |
| CrO₂ | BET value: 30 m²/g Hc: 700 Oe | |
| Upper magnetic layer paint | | |
| Co-γ-Fe₂O₃ | (A) | BET value: 50 m²/g Hc: 800 Oe |
| | (B) | BET value: 40 m²/g Hc: 700 Oe |
| | (C) | BET value: 55 m²/g Hc: 900 Oe |
| Fe—Ni | Ni: 5 atomic % BET value: 60 m²/g Hc: 1600 Oe | |
| Fe—Al | Al: 2 atomic % BET value: 55 m²/g Hc: 1200 Oe | |
| Fe—Ni—Al | Al: 1 atomic %  Ni: 3 atomic % BET value: 65 m²/g Hc: 1800 Oe | |

The following measurements were conducted for the video tapes described above. The results are shown in the following table. The measurement methods are as follows.

Light transmittance: Each video tape was run by a VHS tape deck (HR-6500 manufactured by JVC), and the transmitted light was measured by a SERVOCORDER SR 6312. Since the results of the measurement were expressed by electric potential, it was converted to light transmittance.

Lumi S/N ratio: It was measured by a color video noise meter Shibasoku 925D/1 manufactured by Shibasoku Co.

Surface specific resistance: It was measured by a surface electrometer under the condition that the impressed voltage was 500V.

Envelope: Each video tape was run by a VHS tape deck (type S-7000 manufactured by JVC). The RF envelope was projected in an oscilloscope (manufactured by HITACHI). The screen of the oscilloscope was photographed and the maximum and the minimum of the envelope were read out from the photography. The ratio of the maximum to the minimum was measured.

Evaluation of the damaged tape edge: Each video tape was set in a VHS tape deck, the type of which was NV-6200 manufactured by Matsushita Electric Co. The video tape was run by the tape deck by 200 passes or 400 passes at the temperature of 20° C. and relative humidity of 60%. All the video tapes were investigated to check whether the edges were damaged or not.

Damage of the edge was evaluated as follows.

E ... Excellent
  Damage of the edge was not found.
G ... Good
  The edge is slightly damaged at some portions of the tape. The damage does not affect the tape running.
P ... Partially good
  The edge is partially damaged. The edge is folded especially at the starting portion and the ending portion of the tape.
NG ... No good
  The edge is seriously damaged all through the tape.

Dropout A 100% white signal is recorded on the prescribed section (10 to 30 m) of the magnetic recording medium. When the signal is reproduced, dropouts of 15 μsec at the level of −12 dB are counted by a counter manufactured by Shibasoku Co. the type of which is VH01BZ. The measurement is conducted minute by minute all through the tape to be measured and all the data obtained is averaged. The average is determined to be the result of the measurement.

In the case of a VHS type video deck, when light transmittance of a tape is not less than 0.1%, the light shielding power is not sufficient and in some cases. the tape does not run at the above-mentioned test. In this case, the hole on a cassette which was provided for detecting the tape end, was sealed by a sealing tape to enable the tape to run.

TABLE 1

| | Lower magnetic layer paint | | | Upper magnetic layer paint | | | Substance contained in BC layer (Average particle size μm) |
|---|---|---|---|---|---|---|---|
| | Magnetic powder | Carbon black content (part) | Dry layer thickness (μm) | Magnetic Powder | Carbon black content (part) | Dry layer thickness (μm) | |
| I-1 | Co—γ—Fe₂O₃ | 13 | 2.5 | Co—γ—Fe₂O₃ (A) | 0.5 | 1.0 | — |
| I-2 | " | 13 | 2.5 | Co—γ—Fe₂O₃ (B) | 0.1 | 1.0 | — |
| I-3 | " | 13 | 2.5 | Co—γ—Fe₂O₃ (C) | 0.6 | 1.0 | — |
| I-4 | Co—FeOx (X = 1.35) | 13 | 2.5 | Co—γ—Fe₂O₃ (A) | 0.5 | 1.0 | — |

TABLE 1-continued

| | | | | | | | |
|---|---|---|---|---|---|---|---|
| I-5 | Fe—Al | 13 | 2.5 | " | 0.5 | 1.0 | — |
| I-6 | CrO2 | 13 | 2.5 | " | 0.5 | 1.0 | — |
| C-1 | Co—γ—Fe$_2$O$_3$ | 13 | 2.5 | Co—γ—Fe$_2$O$_3$ (A) | 10 | 1.0 | — |
| C-2 | " | 5 | 2.5 | " | 0.5 | 1.0 | — |
| C-3 | " | 13 | 4.0 | " | 0.5 | 1.0 | — |
| C-4 | " | 13 | 3.5 | — | — | — | — |
| C-5 | — | — | — | Co—γ—Fe$_2$O$_3$ (A) | 0.5 | 3.5 | — |
| I-7 | Co—γ—Fe$_2$O$_3$ | 13 | 2.5 | Co—γ—Fe$_2$O$_3$ (A) | 0.5 | 1.0 | ZnO |
| I-8 | " | 13 | 2.5 | " | 0.5 | 1.0 | BaCo$_3$ |
| I-9 | " | 0 | 2.5 | " | 0.5 | 1.0 | Carbon black |
| I-10 | " | 13 | 2.5 | " | 0.5 | 1.0 | — |
| I-11 | Co—FeOx (X = 1.36) | 0.5 | 2.5 | " | 0.5 | 0.5 | — |
| I-12 | Co—FeOx (X = 1.38) | 0.5 | 2.5 | " | 0.5 | 0.5 | — |
| I-13 | Co—γ—Fe$_2$O$_3$ | 10 | 2.5 | Fe—Ni | 0 | 0.5 | ZnO + Carbon black |
| I-14 | Fe—Al | 12 | 2.5 | Fe—Al | 0.2 | 0.5 | — |
| I-15 | Co—Fe$_3$O$_4$ | 8 | 2.5 | Fe—Ni—Al | 0.8 | 0.5 | BaCO$_3$ + Carbon black |

| | Thickness of base film (μm) | Transmittance of light (%) | Luminescence S/N (db) | Surface-specific resistance (Ω/sq) | Envelope (%) | Damage of edge 200 pass | Damage of edge 400 pass | Drop out (number/min.) |
|---|---|---|---|---|---|---|---|---|
| I-1 | 14.5 | 0.08 | +0.8 | 5.1 × 10$^7$ | 93 | E | G | 2 |
| I-2 | 14.5 | 0.09 | +0.6 | 4.2 × 10$^7$ | 94 | E | G | 3 |
| I-3 | 14.5 | 0.09 | +1.8 | 3.1 × 10$^7$ | 96 | E | G | 2 |
| I-4 | 14.5 | 0.02 | +1.2 | 2.3 × 10$^7$ | 96 | E | G | 1 |
| I-5 | 14.5 | 0.02 | +1.9 | 8.1 × 10$^6$ | 98 | E | G | 8 |
| I-6 | 14.5 | 0.03 | +1.5 | 9.2 × 10$^7$ | 91 | E | G | 9 |
| C-1 | 14.5 | 0.05 | −0.2 | 8.1 × 10$^7$ | 76 | P | NG | 70 |
| C-2 | 14.5 | 1.69 | −0.3 | 6.2 × 10$^1$ | 81 | P | NG | 16 |
| C-3 | 13.0 | 0.08 | +0.6 | 4.3 × 10$^7$ | 46 | G | NG | 24 |
| C-4 | 14.5 | 0.07 | 0 | 5.6 × 10$^7$ | 62 | P | NG | 50 |
| C-5 | 14.5 | 2.10 | +1.2 | 3.4 × 10$^1$ | 77 | P | NG | 32 |
| I-7 | 13.5 | 0.08 | +2.1 | 5.6 × 10$^7$ | 98 | E | E | 1 |
| I-8 | 13.5 | 0.07 | +2.0 | 4.2 × 10$^7$ | 97 | E | E | 1 |
| I-9 | 13.5 | 0.09 | +2.2 | 8.9 × 10$^9$ | 95 | E | G | 1 |
| I-10 | 14.5 | 0.08 | +1.2 | 5.0 × 10$^7$ | 94 | E | G | 2 |
| I-11 | 14.5 | 0.08 | +1.5 | 2.4 × 10$^8$ | 96 | E | G | 1 |
| I-12 | 14.5 | 0.10 | +1.5 | 8.1 × 10$^8$ | 97 | E | G | 1 |
| I-13 | 14.5 | 0.10 | +2.1 | 5.9 × 10$^6$ | 98 | E | G | 6 |
| I-14 | 14.5 | 0.08 | +3.9 | 2.1 × 10$^6$ | 99 | E | G | 5 |
| I-15 | 14.5 | 0.08 | +3.4 | 9.2 × 10$^6$ | 99 | E | G | 3 |

Remarks:
E ... Excellent
G ... Good
P ... Partially good
NG ... No good
I ... Inventive Sample
C ... Comparative Sample As shown in the table, the inventive video tapes of the Example are excellent in electromagnetic conversion characteristics and running durability. Furthermore, they meet the requirements of light transmittance. The light transmittance of the tapes of Examples 2, 3, and 4, is smaller still and the running durability of the tapes of Examples 5 and 6 is more excellent.

Figure 3:
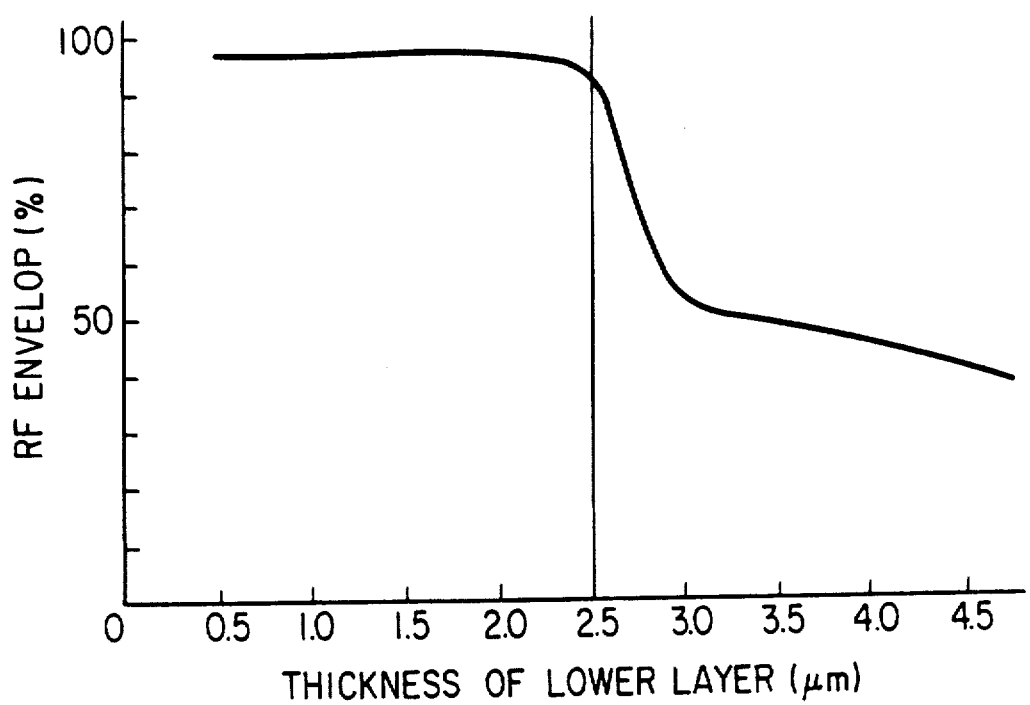
FIG. 3 is a graph showing the relation between the thickness of the lower magnetic layer and the tape characteristics.

FIG. 3 shows the change of the envelope in Example when the thickness of the lower magnetic layer in dry condition is variously changed as shown in FIG. 3.

Figure 4:
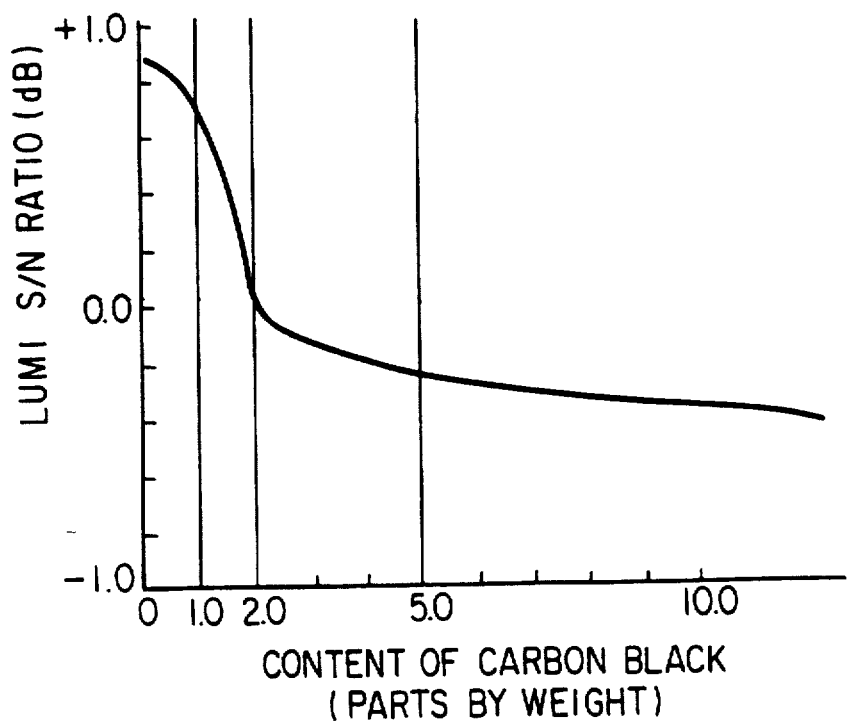
FIG. 4 is a graph showing the relation between the content of carbon black in the upper magnetic layer and S/N ratio.

FIG. 4 shows the change of S/N ratio in Example when the carbon black content of the upper magnetic layer is variously changed as shown in FIG. 4.

According to the results of FIG. 3 and FIG. 4, it can be realized that the value limits determined by the present invention are important.

What is claimed is:

1. A magnetic recording medium comprising a non-magnetic support having thereon a plurality of magnetic layers, wherein the magnetic layer farthest from said support has a thickness of between 0.5 μm and 1.5 μm and comprises a magnetic powder having a specific surface area of between 30 m$^2$/g to 80 m$^2$/g in terms of BET value and a coercive force of 700 to 1000 Oe, a carbon black in an amount of not more than one part per 100 parts, by weight, of said magnetic powder, and a binder, and another magnetic layer having a thickness of not more than 2.5 μm and comprises a magnetic powder having a specific surface area of from 20 m$^2$/g to 70 m$^2$/g in terms of BET value and a coercive force of 400 to 1000 Oe, and a binder, 900 nm light transmittance of said magnetic medium being not more than 0.1 percent.

2. The medium of claim 1, wherein said amount of said carbon black contained in said magnetic layer being provided farthest from said support is within the range of from 0.2 to 0.8 parts per 100 parts by weight of magnetic powder contained said magnetic layer.

3. The medium of claim 1, wherein said magnetic powder contained in said magnetic layer being provided farthest from said support comprises a ferro-magnetic metal containing iron in an amount of at least 80% by weight; or a Co—$\gamma$—$Fe_2O_3$.

4. The medium of claim 3, wherein said magnetic powder comprising Co—$\gamma$—$Fe_2O_3$ has a specific surface area of from 40 $m^2/g$ to 70 $m^2/g$ in terms of BET value and a coercive force Ha of from 700 Oe to 1000 Oe.

5. The medium of claim 1, wherein said another magnetic layer contains a carbon black in an amount of not less than 8 parts per 100 parts by weight of magnetic powder contained in said another magnetic layer.

6. The medium of claim 5, wherein said amount of said carbon black contained in said another magnetic layer is within the range of from 10 to 30 parts per 100 parts by weight of said magnetic powder contained in said another magnetic layer.

7. The medium of claim 1, wherein said another magnetic layer has a thickness of from 1.5 $\mu$m to 2.5 $\mu$m.

8. The medium of claim 1, wherein said magnetic powder contained in said another magnetic layer comprises a magnetite represented by $FeO_x$, in which x is not less than 1.3 and less than 1.5; a ferromagnetic metal; a ferro-magnetic chromium dioxide or a Co—$\gamma$—$Fe_2O_3$.

9. The medium of claim 8, wherein said magnetic powder comprises said magnetite.

10. The medium of claim 1, wherein said magnetic recording medium has a back-coat layer on a surface of said support opposite to the surface on which said magnetic layers are provided.

11. The medium of claim 10, wherein said back-coat layer comprises a binder and a non-magnetic particle.

12. The medium of claim 11, wherein said non-magnetic particle is a carbon black.

13. The medium of claim 11, wherein said non-magnetic particle is a particle of an inorganic substance.

14. The medium of claim 11, wherein said back-coat layer comprises a binder, a carbon black and a particle of an inorganic substance.

* * * * *